March 24, 1970            G. M. FEHN            3,502,754
PROCESS OF EXTRUDING A CELLULAR POLYMERIC COMPOSITION
Filed May 21, 1965
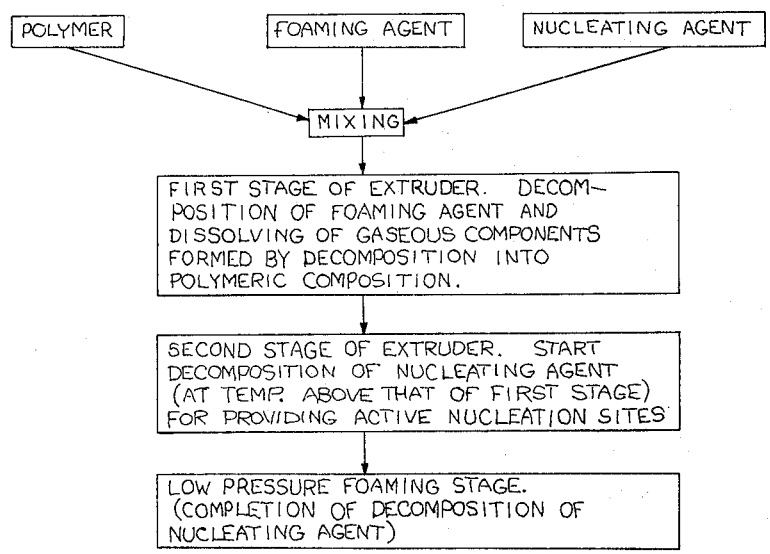
INVENTOR.
GREGORY M. FEHN
BY
Donald Keith Wedding
ATTORNEY United States Patent Office 3,502,754
Patented Mar. 24, 1970

3,502,754
PROCESS OF EXTRUDING A CELLULAR
POLYMERIC COMPOSITION
Gregory M. Fehn, Toledo, Ohio, assignor to Owens-Illinois, Incorporated, a corporation of Ohio
Filed May 21, 1965, Ser. No. 457,834
Int. Cl. B29d 7/02, 27/00
U.S. Cl. 264—54                    4 Claims

ABSTRACT OF THE DISCLOSURE

There is disclosed the preparation of polymeric foam having a substantially uniform cell size which comprises the incorporation of foaming and nucleating agents into a polymeric composition, feeding the composition into the first stage of an extruder so as to decompose the foaming agent, feeding the composition into the second stage of the extruder so as to decompose the nucleating agent, and then feeding the composition into a lower pressure zone so as to foam the composition.

---

The present invention relates to a process for extruding cellular polymeric compositions and particularly foamable cellular polymeric compositions which are suitable for the formation of polymeric containers.

Foams produced from polymeric type compositions represent a valuable class of materials which find wide application in the manufacture of various consumer and industrial articles. One widely used method for making polymeric plastic foams comprises extruding the polymer by means of screw type extruders. When polymeric foams are prepared by extrusion it is difficult to obtain stable foams which possess the requisite properties of good rigidity and uniform fine cell structure wherein the individual cells have diameters of less than 7 mils. Specifically, in the blowing of plastic bottles, it has been difficult to obtain bottles which will not rupture during the blowing thereof due to the instability of the polymeric foam employed. The prior art teaches the preparation of cellular polymeric compositions by the use of both gaseous and solid blowing agents. However, these prior art processes are disadvantageous in that non-uniform quality foams are produced. More specifically, when an external source of gas is used as a blowing agent, the uniform metering and mixing of the gas with the polymer is extremely difficult. Accordingly, foams having non-uniform density and cells of uneven size and of uneven distribution are produced. When a single solid blowing agent is used as both a foaming agent and a nucleating agent small changes in the operating conditions drastically affect the ratio of foaming gas to nucleation sites, with the result that foams having non-uniform quality are produced. Likewise, if the operating conditions are not carefully controlled, some of the blowing agents will remain undecomposed in the finished foam thereby giving it an undesirable color.

Accordingly, it is an object of this invention to provide an improved process for extruding a stable polymeric foam which is resistant to the fabricating stresses and strains present during the manufacture of articles therefrom.

A further object of this invention is to provide an improved process for extruding a foamed polymeric composition having a uniform density in which the cell size in the extruded foam are substantially uniform and less than about 7 mils in diameter.

More specifically, an object of this invention is the preparation of a stable polyethylene foam from high density polyethylene Other objects and advantages of the invention will become apparent from the following detailed description thereof.

Reference is made to the drawing which schematically illustrates in block diagram form the practice of this invention.

The novel method of extruding the foamable cellular polymeric foams for example, polyethylene foams according to this invention, is effected through the use of two chemical blowing agents with different time-temperature decomposition rates. More specifically, it has been discovered that when a small quantity of two chemical blowing agents, namely, a foaming agent and a nucleating agent, are incorporated in a polymer, the resulting composition can be extruded by conventional methods and apparatus so as to form cellular polymeric foams in which the cell sizes are substantially uniform and less than about 7 mils in diameter.

Foamable polymeric materials which can be utilized in the present invention include synthetic organic polymeric substances, both homopolymeric and copolymeric, such as vinyl resins formed by the polymerization of vinyl halides or by the copolymerization of vinyl halides with unsaturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadienes and styrenes; poly-$\alpha$-olefins such as polyethylene, polypropylene, polybutylene, polyisoprene and the like, including copolymers of poly-$\alpha$-olefins; polyurethanes such as are prepared from polyols and organic polyisocyanates; polyamides such as polyhexamethylene adipamide; polyesters such as polymethylene terephthalates; polycarbonates; polyacetals; polystyrene, polyethylene oxide; copolymers such as polystyrene containing copolymers of butadiene and styrene and those formed by the copolymerization of acrylonitrile, butadiene and/or styrene; acrylic resins as exemplified by the polymers of methyl acrylate, acrylamide, methylol acrylamide, acrylonitrile, and copolymers of these with styrene, vinyl pyridines, etc.; neoprene; condensates of aldehydes, especially formaldehyde and formaldehyde engendering substances such as paraformaldehyde; modified and unmodified condensates of hydroxy benzenes like phenol, resorcinol, etc., with the aforementioned aldehydes; silicones such as dimethyl and methyl hydrogen polysiloxanes; unsaturated polyesters; and cellulose esters including the nitrate, acetate, propionate, etc. This list is not meant to be limited or exhaustive but merely to illustrate the wide range of polymeric materials which may be employed in the present invention.

The process as taught in this invention is adapted to utilize wide ranges of blowing agents for example, blowing agents such as azobisformamide, azobisisobutyronitrile, diazoaminobenzene, N,N - dimethyl - N,N-dinitroso terephthalamide, N,N-dinitrosopentamethylenetetramine, benzenesulfonyl-hydrazide, benzene-1,3-disulfonyl hydrazide, diphenylsulfo-3,3-disulfonyl hydrazide, 4,4'-oxybis benzene sulfonyl hydrazide, p-toluene sulfonyl semicarbazide, barium azodicarboxylate, butylamine nitrile, nitroureas, trihydrazino triazine, phenylmethylurethane p-sulfonhydrazide.

The process of this invention is particularly suitable to blowing cellular high density polyethylene. High density polyethylene having a density of about 60 lbs. per cu. ft. is utilized as a starting material. Said high density polyethylene is foamed using a nucleating agent such as azobisformamide and a foaming agent such as N-N'-dimethyl-N,N'-dinitroso terephthalamide to produce cellular polyethylene having a uniform density from about 30 to about 43 lbs. per cu. ft. This cellular polyethylene is particularly suited to blow molding procedures, its physical properties being such that it does not rupture during blowing.

It is to be noted that in the process of this invention two blowing agents are utilized. One blowing agent has foaming characteristics and decomposes at a temperature which is near the minimum processing point of the polymer utilized and thereby provides foaming gas. This early formation of the foaming gas is particularly advantageous in that it gives the foaming gas ample time to evenly dissolve in the polymeric mixture as said mixture passes through the length of the extruder. Due to this fact the process of this invention produces foams of uniform density which have cells which are exceptionally uniform as to size and dispersion. The second blowing agent has nucleating characteristics and decomposes at a higher temperature which is under the decomposition temperature of the polymer providing nucleating sites which form cells with the above mentioned foaming gas when the composite mixture is removed from the extrusion die. The decomposition rate of the nucleating agent is such that some of the nucleating agent decomposes before the extrudate leaves the extrusion die. This prior decomposition does not provide nucleating sites. Conversely, the decomposition rate is such that ample nucleating agent to provide nucleation sites is in an undecomposed state as the extrudate leaves the extrusion die. This undecomposed nucleating agent decomposes just as the extrudate leaves the die and thereby provides nucleation sites for the prior produced foaming gas. The formation of these nucleating sites just as the extrudate is being removed from the extrusion die is desirable as the nucleating sites are not destroyed in their passage through the extruder. Likewise, due to the fact that the nucleation sites are freshly created, they are in an active state.

The subject invention utilizes a variable temperature extruder. The first stages of this extruder are kept at a temperature which is slightly above the minimum processing point of the polymer used and slightly above decomposition temperature of the foaming agent utilized. Accordingly, in the early stages of the extrusion process the foaming agent decomposes thereby allowing the foaming gas time to uniformly dissolve in the polymeric mixture as said mixture passes through the extruder. The latter stages of the extruder are maintained at a somewhat higher temperature which is below the decomposition temperature of the polymer and at or slightly above the decomposition temperature of the nucleating agent utilized. Therefore, in the latter stages of the extruder, the nucleating agent decomposes thereby causing the formation of active nucleation sites, at which foaming occurs, when the extrudate is removed from the extrusion die.

A preferred temperature range for the extruder is from about 20° F. to about 200° F. above the minimum processing point of the polymer. When high density polyethylene is used as a starting material, the preferred extrusion temperature range is from about 350–420° F.

Known blowing agents having foaming and nucleating characteristics exhibit a wide range of decomposition temperatures. Therefore, regardless of the polymer chosen, it is possible to choose a blowing agent which has foaming characteristics which will decompose near the minimum processing point of the polymer. Likewise, it is possible to choose a blowing agent which has nucleating characteristics which will decompose at a temperature under the decomposition temperature of the polymer.

The physical properties of the foaming agent and the nucleating agent, notably the decomposition rate, should be such that substantial decomposition of the foaming agent occurs in the early stages of the extruder with only minimal decomposition of the nucleating agent in these early stages. Conversely, the physical properties of the nucleating agent must be such that it substantially decomposes in the latter stages of the extruder and within the extrudate as it is removed from the extrusion die. While the decomposition rate of the foaming agent and the nucleating agent is of prime importance, in the regulation of the formation of the foaming gas and nucleating sites, these rates of formation can be controlled by regulating the operating conditions of the extruder. That is, these relative rates of formation can be controlled by the temperature of the extruder, its temperature gradient and by the residence time of the foamable mixture in the extruder.

The extrudate mixture comprises a major portion of the polymer, that is from about 96 to about 99.74 percent by weight polymer. It likewise contains a minor amount of a blowing agent which has foaming characteristics, that is from about 2 to about .25 percent of said foaming agent and a minor amount of a blowing agent having nucleating characteristics, that is from about 2 to about 0.01 percent. A more preferred percentage range is from about 97.5 to about 99.65 percent polymer, from about 1.50 to about 0.30 percent foaming agent and from about 1.00 to about 0.05 percent nucleating agent. When foam is being produced from high density polyethylene a preferred operating composition comprises from about 1.00 to about 0.40 percent of a foaming agent consisting of N,N'-dimethyl-N,N'-dinitroso terephthalamide from about 0.50 to about 0.1 percent of a nucleating agent comprising azobisformamide and from about 98.50 to about 99.50 percent high density polyethylene.

The above described compositions are not meant to be limiting. The compositions adapted for use in this invention can contain other components such as fillers, antioxidants, stabilizers, antistatic agents, pigments, dyes, etc.

The compositions adapted for use in this invention are prepared by grinding the blowing agents to about 2 microns and then mixing the desired percentages of the foaming and nucleating blowing agents with the granular polymer. A composition suitable for extrusion is then produced by dry blending, in a mixer such as a Littleford blender.

The following examples will illustrate the preparation of cellular polymeric compositions by means of the subject invention. These examples are given for purposes of illustration and not for purposes of limiting this invention.

EXAMPLE I

To 99.15 parts by weight of high density polyethylene (Marlex 6035) pellets one-eighth inch diameter and having a density of about .96 g. per cu. cm. (60 lbs. per cubic feet), 0.75 part by weight if N,N'-dimethyl-N,N'-dinitroso terephthalamide and 0.1 part by weight of azobisformamide are uniformly blended in a Littleford blender. The resulting mixture is then introduced into the charging hopper of an extruder and mixed within the interior of the extruder which is maintained at a temperature of from 350–390° F. so as to effect melting of the polyethylene. The polyethylene is delivered from the extruder as an extrudate having a density of about 30.0 lbs. per cubic foot and having uniform pores ranging from 2.5 to 3 mils in diameter. During the passing of the polyethylene through the extruder, the N,N'-dimethyl-N,N'-dinitroso terephthalamide thermally decomposes first creating foam gas, and the azobisformamide which thermally decomposes later at a higher temperature, effects the nucleation of the foaming gas in the polyethylene as the foamable melt is removed from the extrusion die.

EXAMPLE II

The procedure of Example I is repeated except 99.4 parts of the polyethylene, 0.5 part of 4,4'-oxybis benzene sulfonyl hydrazide, and 0.1 part of azobisformamide are employed. The extrudate formed is characterized by cells of uniform size of about 5 to about 6 mils and has a density of about 38.7 lbs. per cubic foot.

The polyethylene foam produced has a high melt strength which makes it admirably suited for the blowing of polyethylene bottles.

EXAMPLE III

Utilizing the procedure of Example I the azobisformamide was omitted. The resulting foam was characterized by a very large irregularly shaped cell having a diameter of from 30 to 35 mils. The product foam had a density of 54.2 lbs. per cubic foot.

EXAMPLE IV

Again using the procedure of Example I, the N,N'-dimethyl-N,N'-dinitroso terephthalamide was omitted. No foaming took place, that is the 0.1 part by weight of azobis formamide did not cause foaming. The resulting product density was 60 lbs. per cubic foot.

EXAMPLE V

Repeating the procedure as discussed in Example II the azobisformamide was omitted from the mixture. The resulting foam was characterized by very large cells having an average diameter 25 to 30 mils. The density of the final product was 56.7 lbs. per cubic foot indicating a very low degree of gas entrapment.

EXAMPLE VI 99.3 parts by weight of a high density polyethylene having a density of 60 lbs. per cubic foot was blended with 0.5 part by weight of 4,4'-oxybis benzene sulfonyl hydrazide and 0.2 part by weight of p-toluene sulfonyl semicarbizide. Upon extrusion, the resulting foam was characterized by small, spherically-shaped cells having an average diameter of 6–7 mils. The density of the final product was found to be 42.4 lbs. per cubic foot. The operating temperature range of the extruder was 400–430° F.

EXAMPLE VII 99.10 parts by weight of a polystyrene resin having a density of 65.5 lbs. per cubic foot was dry blended with 0.75 part by weight of N,N'-dimethyl-N,N'-dinitroso terephthalamide, and 0.15 part by weight of azobisformamide. Upon extrusion, the resulting foam was characterized by very small cells having an average diameter of 3–4 mils. The density of the product foam was 37.0 lbs. per cubic foot. The operating temperature range of the extruder was 360–390° F.

EXAMPLE VIII

Example VII was repeated except that the azobisformamide was omitted from the mixture. The resulting foam was characterized by very large cells having an average diameter of 16–20 mils. The density reduction was found to be only 10 percent with the density of the final product being 58.8 lbs. per cubic foot indicating a low degree of foaming gas entrapment. The operating temperature range of the extruder was 360–390°F.

EXAMPLE IX 99.3 parts by weight of a polypropylene resin having a density of 55.5 lbs. per cubic foot was dry blended with 0.5 part by weight of 4,4'-oxybis benzene sulfonyl hydrazide and 0.2 part by weight of p-toluene sulfonyl semicarbazide. Upon extrusion, the resulting foam was characterized by small, spherically-shaped cells having an average diameter of 4–5 mils. The density reduction was found to be 51 percent. The density of the final product was 27.0 lbs. per cubic foot. The extruder was operated over a temperature range of 400–430° F.

EXAMPLE X

Example IX was repeated except that the p-toluene sulfonyl semicarbazide was omitted from the mixture. The resulting foam was characterized by very large, irregularly-shaped cells having an average diameter of 16–20 mils. The density of the resulting product was 33.7 lbs. per cubic foot.

What is claimed is:

1. A process for preparing a polymeric foam having a substantially uniform cell size which comprises incorporating small effective amounts of a foaming agent and a nucleating agent into an extrudable thermoplastic polymeric composition, the foaming agent having a temperature of decomposition below that of the nucleating agent, feeding the polymeric composition into the first stage of a variable temperature extruder, said first stage having a temperature sufficient to decompose the foaming agent without significant decomposition of the nucleating agent, uniformly dissolving the gas formed by the decomposition of the foaming agent into the polymeric composition, feeding the polymeric composition to a second stage of the extruder having a temperature sufficient to decompose the nucleating agent and provide active nucleation sites for the initiation of cell formation during foaming, and then withdrawing the polymeric composition from the extruder into a zone of lower pressure so as to foam the composition.

2. The process of claim 1 wherein the extrudable thermoplastic polymeric composition is high density polyethylene.

3. The process of claim 2 wherein the nucleating agent is selected from the group consisting of azobisformamide and p-toluene sulfonyl semicarbizide.

4. The process of claim 3 wherein the amounts of blowing agent and nucleating agent range from about .25 to about 2 percent by weight and about .01 to about 2 percent by weight, respectively, based on the total weight of the composition fed into the first stage of the extruder.

References Cited

UNITED STATES PATENTS

| 2,518,454 | 8/1950  | Elliott     | 264—47 XR |
| 2,861,898 | 11/1958 | Platzer     | 117—100   |
| 2,941,965 | 6/1960  | Ingram      | 260—2.5   |
| 3,198,859 | 8/1965  | Tomlinson   | 264—55    |
| 3,200,176 | 8/1965  | Baxter      | 264—54    |
| 3,225,127 | 12/1965 | Scott       | 264—54    |
| 3,278,466 | 10/1966 | Cram et al. | 260—2.5   |
| 3,399,098 | 8/1968  | Omoto et al.| 264—51 XR |

OTHER REFERENCES

Morgan, Phillip: Plastics Progress 1955, London, Iliffe & Sons, 1955, pp. 64, 65, 69–71 in title page.

Hansen, Ralph H.: "Production of Fine Cells in the Extrusion of Foams," in SPE. Journal, January 1962, pp. 77–82.

Hansen, R. H.: "Novel Methods for the Production of Foamed Polymers: I. Nucleation of Dissolved Gas by Localized Hot Spots, 20th Annual Tech. Confr., Tech. Papers, vol. 10, Atlantic City, Jan. 27–30, 1964, SPE. pp. 1–4 and title page.

PHILIP E. ANDERSON, Primary Examiner

U.S. Cl. X.R.

264—98; 260—2.5